(12) United States Patent
Dannecker et al.

(10) Patent No.: US 9,361,273 B2
(45) Date of Patent: Jun. 7, 2016

(54) CONTEXT-AWARE PARAMETER ESTIMATION FOR FORECAST MODELS

(75) Inventors: Lars Dannecker, Desden (DE); Robert Schulze, Dresden (DE); Matthias Boehm, San Jose, CA (US); Wolfgang Lehner, Dresden (DE)

(73) Assignee: SAP SE, Walldorf (DE)

(*) Notice: Subject to any disclaimer, the term of this patent is extended or adjusted under 35 U.S.C. 154(b) by 747 days.

(21) Appl. No.: 13/554,745

(22) Filed: Jul. 20, 2012

(65) Prior Publication Data

US 2013/0024170 A1 Jan. 24, 2013

Related U.S. Application Data

(60) Provisional application No. 61/510,215, filed on Jul. 21, 2011.

(51) Int. Cl.
*G06F 17/18* (2006.01)
*G06Q 10/06* (2012.01)
*G06F 17/50* (2006.01)

(52) U.S. Cl.
CPC .............. *G06F 17/18* (2013.01); *G06Q 10/063* (2013.01); *G06F 17/5009* (2013.01); *G06F 2217/78* (2013.01)

(58) Field of Classification Search
None
See application file for complete search history.

(56) References Cited

U.S. PATENT DOCUMENTS

| | | | |
|---|---|---|---|
| RE32,326 E * | 1/1987 | Nagel ..................... G06F 3/153 348/463 |
| 5,748,851 A * | 5/1998 | Iokibe et al. ................... 706/58 |
| 6,370,437 B1 * | 4/2002 | Carter et al. .................... 700/52 |
| 6,577,962 B1 * | 6/2003 | Afshari .......................... 702/61 |
| 6,611,726 B1 * | 8/2003 | Crosswhite .................... 700/99 |
| 7,542,881 B1 * | 6/2009 | Billiotte ................ G05B 17/02 703/2 |
| 7,689,456 B2 * | 3/2010 | Schroeder et al. ........... 705/7.31 |
| 7,716,022 B1 * | 5/2010 | Park et al. ........................ 703/2 |
| 8,014,983 B2 * | 9/2011 | Crowe et al. ..................... 703/2 |
| 8,140,193 B2 * | 3/2012 | Lee ............................... 700/291 |
| 8,209,124 B2 * | 6/2012 | Dannevik ............... G01W 1/00 702/189 |
| 8,374,903 B2 * | 2/2013 | Little .......................... 705/7.31 |
| 8,406,935 B2 * | 3/2013 | Ko et al. ...................... 700/291 |
| 2003/0200134 A1 * | 10/2003 | Leonard et al. ................ 705/10 |
| 2004/0102937 A1 * | 5/2004 | Ibrahim ........................... 703/2 |
| 2005/0004858 A1 * | 1/2005 | Foster et al. ................... 705/36 |

(Continued)

OTHER PUBLICATIONS

I. Zliobiate, "Learning under Concept Drift: an Overview" pp. 1-36, 2010.*

(Continued)

*Primary Examiner* — Kibrom K Gebresilassie
(74) *Attorney, Agent, or Firm* — Fish & Richardson P.C.

(57) ABSTRACT

Methods, systems, and computer-readable storage media for providing at least one parameter for use with a forecast model. Implementations include actions of receiving a first context vector, the first context vector including a plurality of context attributes that describe a first context, retrieving a first parameter vector from a repository based on the first context vector, the repository electronically storing a plurality of parameter vector, each parameter vector being associated with a respective context and including one or more parameters, parameterizing the forecast model based on parameters provided in the first parameter vector to provide a parameterized forecast model, optimizing the parameterized forecast model to provide an optimized forecast model, and forecasting one or more values using the optimized forecast model.

20 Claims, 6 Drawing Sheets

(56) References Cited

U.S. PATENT DOCUMENTS

| | | | |
|---|---|---|---|
| 2005/0165635 A1* | 7/2005 | Moessner | 705/10 |
| 2005/0192915 A1* | 9/2005 | Ahmed et al. | 706/21 |
| 2006/0028564 A1* | 2/2006 | Baer | H04N 5/23225 348/294 |
| 2006/0167591 A1* | 7/2006 | McNally | 700/291 |
| 2007/0041663 A1* | 2/2007 | Cho et al. | 382/299 |
| 2007/0203783 A1* | 8/2007 | Beltramo | 705/10 |
| 2007/0208608 A1* | 9/2007 | Amerasinghe et al. | 705/10 |
| 2008/0294651 A1* | 11/2008 | Masuyama et al. | 707/100 |
| 2009/0187284 A1* | 7/2009 | Kreiss et al. | 700/291 |
| 2009/0216611 A1* | 8/2009 | Leonard et al. | 705/10 |
| 2009/0319310 A1* | 12/2009 | Little | 705/7 |
| 2010/0082172 A1* | 4/2010 | Ko et al. | 700/291 |
| 2011/0190951 A1* | 8/2011 | Lee | 700/291 |
| 2012/0016528 A1* | 1/2012 | Raman et al. | 700/291 |
| 2012/0089381 A1* | 4/2012 | Chu | G01W 1/00 703/6 |
| 2012/0303411 A1* | 11/2012 | Chen et al. | 705/7.31 |
| 2013/0132045 A1* | 5/2013 | Mello | G06F 7/60 703/2 |
| 2013/0268196 A1* | 10/2013 | Dam | 702/3 |
| 2014/0302927 A1* | 10/2014 | Ditton | G07F 17/3239 463/31 |
| 2015/0120223 A1* | 4/2015 | Dannecker | G06F 17/5009 702/61 |
| 2015/0120269 A1* | 4/2015 | Dannecker | G06F 17/5009 703/18 |
| 2015/0153476 A1* | 6/2015 | Prange | E21B 43/00 703/2 |

OTHER PUBLICATIONS

U. Fischer, F. Rosenthal, M. Boehm, and W. Lehner, "Indexing Forecast Models for Matching and Maintenance" pp. 26-31, 2010.*
S. Mantica, A. Cominelli, E. Agip, G. Mantica "Combining Global and Local Optimization Techniques for Automatic History Matching Production and Seismic Data" pp. 1-10, SPE 2001.*
U. Fischer, F. Rosenthal, M. Boehm, and W. Lehner, "Indexing Forecast Models for Matching and Maintenance", pp. 26-31, 2010.*
I. Zliobaite, "Learning under Concept Drift: an Overview" pp. 1-36, 2010.*
Lars Dannecker et al., "Context-Aware Parameter Estimation for Forecast Models in the Energy Domain," Proceedings of the 23rd International Conference on Scientific and Statistical Database Management, SSDBM'11, Jul. 2011, pp. 491-508.
MIRABEL Project [online], 2011, retrieved on Dec. 6, 2012 from http://www.mirabel-project.eu/, 1 page, "What is the Mirabel Project?"
Address Project [online], 2011, retrieved on Dec. 5, 2012 from http://www.addressfp7.org/, 1 page, "Towards the smart grids of the future".
The MeRegio Project [online], 2011, retrieved on Dec. 5, 2012 from http://www.meregio.de/en/, 1 page, "Smart Grids".
Smarthouse Smartgrid Project [online], 2011, retrieved on Dec. 5, 2012 from http://www.smarthouse-smartgrid.eu/, 2 pages.
Box et al., Time Series Analysis: Forecasting and Control, John Wiley & Sons Inc. (2008), 790 pages.
Peter R. Winters, "Forecasting Sales by Exponentially Weighted Moving Averages," Management Science, vol. 6, No. 3, Apr. 1960, pp. 324-342.
Henrique Steinherz Hippert et al., "Neural Networks for Short-Term Load Forecasting: A Review and Evaluation," IEEE Transactions on Power Systems, vol. 16, No. 1, Feb. 2001, pp. 44-55.
Ping-Feng Pai et al., "Support vector machines with simulated annealing algorithms in electricity load forecasting," Energy Conversion and Management, vol. 46, Apr. 2005, pp. 2669-2688.
Rob J. Hyndman, "Another Look at Forecast-Accuracy Metrics for Intermittent Demand," Foresight: The International Journal of Applied Forecasting, Issue 4, Jun. 2006, pp. 43-46.
Paul Goodwin et al., "On the asymmetry of the symmetric MAPE," International Journal of Forecasting, vol. 15, Issue 4, Oct. 1999, pp. 405-408.
S. Kirkpatrick et al., "Optimization by Simulated Annealing," Science, vol. 220, No. 4598, May 13, 1983, pp. 671-680.
J. A. Nelder et al., "A simplex method for function minimization," The Computer Journal, vol. 7, Issue 4, 1965, pp. 308-313.
Alexey Tsymbal, "The problem of concept drift: definitions and related work," Technical report, Department of Computer Science Trinity College Dublin, Department of Computer Science, Apr. 29, 2004, 7 pages.
Gerhard Widmer et al., "Learning in the Presence of Concept Drift and Hidden Contexts," Machine Learning, vol. 23, 1996, pp. 69-101.
Heiko Hahn et al., "Electric load forecasting methods: Tools for decision making," European Journal of Operational Research, vol. 199, Issue 3, Dec. 2009, pp. 902-907.
James W. Taylor, "Triple Seasonal Methods for Short-Term Electricity Demand Forecasting," European Journal of Operational Research, vol. 204, 2010, pp. 139-152.
Ramu Ramanathan et al., "Short-run forecasts of electricity loads and peaks," International Journal of Forecasting, vol. 13, Issue 2, 1997, pp. 161-174.
Indre Zliobaite, "Learning under Concept Drift: an Overview," Technical report, Vilnius University, 2009, 36 pages.
Agnar Aamodt et al., "Case-Based Reasoning: Foundational Issues, Methodological Variations, and System Approaches," AI Communications, IOS Press, vol. 7, Issue 1, 1994, pp. 39-59.
Jorg Becker et al., "Towards more Reuse in Conceptual Modeling—A Combined Approach using Contexts," Proceedings of the CAiSE'07 Forum at the 19th International Conference on Advanced Information Systems Engineering, Jun. 2007, 4 pages.
Donald J. Berndt et al., "Using Dynamic Time Warping to Find Patterns in Time Series," AAAI Technical Report WS-94-03, AAAI-94 Workshop on Knowledge Discovery in Databases, Apr. 26, 1994, pp. 359-370.
Michail Vlachos et al., "Discovering Similar Multidimensional Trajectories," Proceedings of the 18th International Conference on Data Engineering, ICDE'02, Mar. 2002, pp. 673-684.
Sedgewick, R., Algorithms, Second Edition, Addison-Wesley (1988), 654 pages.
nationalgrid, "Metered half-hourly electricity demands," [online], 2010, retrieved on Dec. 5, 2012 from htip://www.nationalgrid.com/uk/Electricity/Data/Demand+Data/, 2 pages.

* cited by examiner

CONTEXT-AWARE PARAMETER ESTIMATION FOR FORECAST MODELS

CROSS REFERENCE TO RELATED APPLICATION

This application claims priority to U.S. Provisional App. No. 61/510,215 filed on Jul. 21, 2011, the disclosure of which is expressly incorporated herein by reference in its entirety.

BACKGROUND

Forecasting is useful in several contexts. In an example context, balancing energy demand and energy supply ensures stable electricity grids. This task relies on computing accurate forecasts of future electricity consumption and production at any point in time and at any level of granularity. The increasing usage of renewable energy sources and the increasing accessibility to energy markets provide additional challenges to balancing energy demand and energy supply. Renewable energy sources are highly dependent on external influences (e.g., weather conditions), and customer energy needs can be erratic. Thus, in order to supply adequate amounts of energy to its customers, utility companies need to be capable of accurately and efficiently forecasting energy demands in real time. Historic electricity time series can provide useful starting points for optimizing current electricity forecast models.

SUMMARY

Implementations of the present disclosure include computer-implemented methods for providing at least one parameter for use with a forecast model. Implementations include actions of receiving a first context vector, the first context vector including a plurality of context attributes that describe a first context, retrieving a first parameter vector from a repository based on the first context vector, the repository electronically storing a plurality of parameter vector, each parameter vector being associated with a respective context and including one or more parameters, parameterizing the forecast model based on parameters provided in the first parameter vector to provide a parameterized forecast model, optimizing the parameterized forecast model to provide an optimized forecast model, and forecasting one or more values using the optimized forecast model.

In some implementations, retrieving a first parameter vector from a repository includes: identifying a sub-plurality of parameter vectors based on the first context vector, the sub-plurality of parameter vectors including the first parameter vector, for each parameter vector in the sub-plurality of parameter vectors, determining a cross-correlation coefficient, and determining that a cross-correlation coefficient associated with the first parameter vector is the highest cross-correlation coefficient of the parameter vectors in the sub-plurality of parameter vectors and, in response, retrieving the first parameter vector.

In some implementations, each cross-correlation coefficient reflects a distance between context attributes of the respective context and context attributes of the first context vector.

In some implementations, each cross-correlation factor is provided as a Pearson cross-correlation coefficient.

In some implementations, the repository is organized into a binary search tree.

In some implementations, the binary search tree includes a plurality of decision nodes and a plurality of leaf nodes, each decision node associated with a context attribute, each leaf node associated with one or more parameter vectors provided in a sub-plurality of parameter vectors.

In some implementations, at least one decision node contains a splitting context attribute, a splitting value, and references to a left successor node and a right successor node.

In some implementations, retrieving a first parameter vector includes traversing nodes of the binary search tree based on context attributes of the first context vector.

In some implementations, actions further include re-traversing nodes of the binary search tree based on context attributes to retrieve a second parameter vector, and parameterizing the forecast model based on parameters provided in the second parameter set to provide the parameterized forecast model.

In some implementations, re-traversing nodes of the binary search tree includes performing a ball-overlap-bounds test at a decision node to evaluate an existence of additional parameter vectors that may be present in an opposite branch of the decision node.

In some implementations, actions further include: receiving a second context vector, the second context vector including a plurality of context attributes that describe a second context, retrieving a second parameter vector from the repository based on the second context vector, parameterizing the forecast model based on parameters provided in the second parameter vector to provide the parameterized forecast model, optimizing the parameterized forecast model to provide the optimized forecast model, and forecasting one or more values using the optimized forecast model.

In some implementations, receiving a second context vector occurs in response to a context drift from the first context to the second context.

In some implementations, the context drift includes one of an abrupt drift, a persistent drift and a cyclic drift.

In some implementations, actions further include receiving the first parameter vector and a respective context vector, and storing the first parameter vector in the repository based on context attributes of the respective context vector.

In some implementations, storing the first parameter vector includes: traversing a binary search tree structure of the repository to identify a leaf node having a context that is most similar to the respective context vector, and inserting the first parameter vector into the leaf node.

In some implementations, storing the first parameter vector includes: traversing a binary search tree structure of the repository to identify a leaf node having a context that is most similar to the respective context vector, and determining that a number of parameter vectors exceeds a maximum leaf node capacity and, in response, adding at least two child nodes to the leaf node, splitting parameter vectors of the leaf node into at least two groups, populating that at least two child nodes with the at least two groups, respectively, and converting the leaf node into a decision node with references to the at least two child nodes.

In some implementations, splitting the parameter vectors into at least two groups is performed based on a splitting attribute and a split value that are determined from the models stored in the leaf node and based on a median value.

In some implementations, context attributes include one or more of numerical attributes, nominal attributes and cyclic attributes.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to using forecast models to predict future behavior. Forecast models can utilize historic subsequences of time series in order to predict future behavior, to improve the accuracy of the future predictions by estimating model parameters that minimize the forecast error, and to evaluate the forecast model. Given that a time series can change constantly and can include large historical basis, re-estimating the parameters of a forecast model can be a very time-consuming process. In order to reduce the amount of time needed to maintain a current forecast model, previously employed forecast parameters can be used as starting points for optimizing the model.

In accordance with the present disclosure, previously used forecast model parameters can be stored in a Context-Aware Forecast Model Repository (CFMR) along with information about the context in which the parameters were valid and the last time that the parameters were used. The current context of a time series can be compared to similar past contexts of the time series in the CFMR, and a current forecast model can be populated with parameters retrieved from the CFMR based on context. The retrieved model parameters can be used as starting points for optimizing the current forecast model with respect to a non-zero, local neighborhood. In some examples, local optimization algorithms can follow a directed approach (e.g., the Nelder-Mead Simplex search) and converge to a solution relatively quickly, but at the risk of becoming trapped in one of many local minima. In some examples, the algorithm can simultaneously search the whole (global) parameter space for solutions to the current forecast model. Global optimization algorithms (e.g., Simulated Annealing) search for the globally optimal solution (but do so at the cost of slow solution convergence speed) and are often not as accurate as local search algorithms.

Implementations of the present disclosure will be described with respect to an example behavior of energy consumption or production. Subsequences of historic energy time series can be used to predict future energy demands or provisions, which can further enable utility companies to quickly react to changing energy demands or supply. The context of an energy time series can be affected by several factors, including seasonal weather patterns, public events, and power outages.

Figure 1:
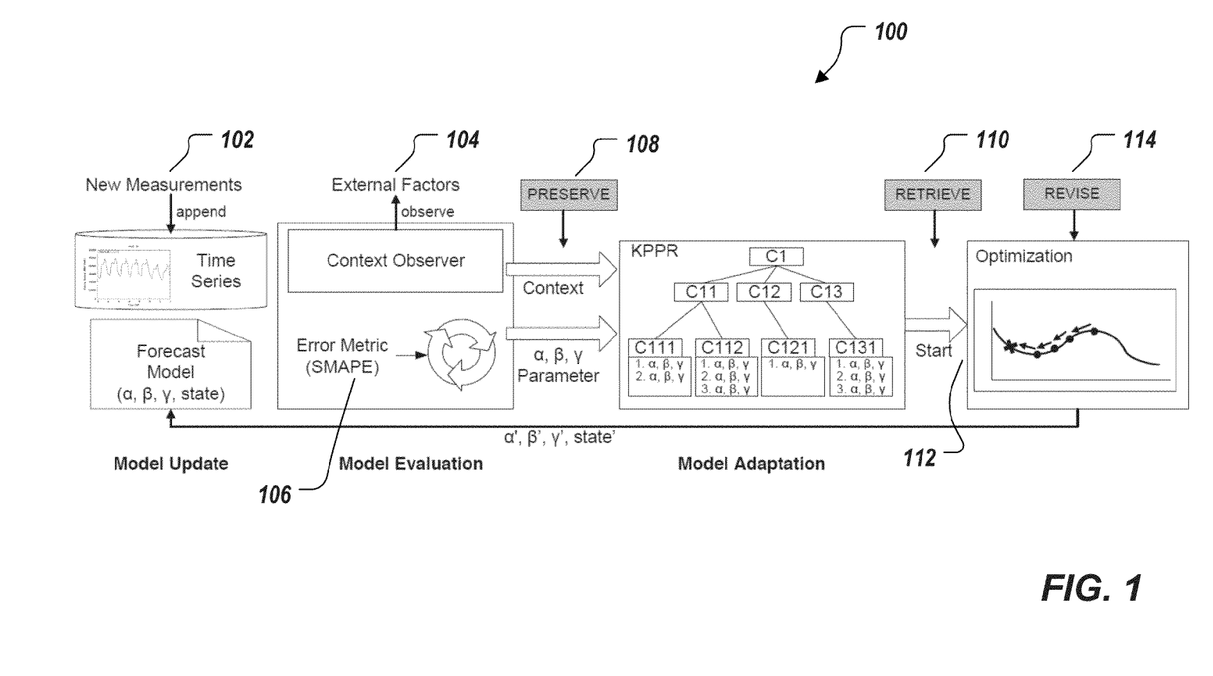
FIG. 1 is a diagram depicting an example Context-Aware Forecast Model Maintenance system.

FIG. 1 is a diagram depicting an example Context-Aware Maintenance system 100. In some implementations, one or more new measurements can be appended to a current time series 102, while the state of the forecast model can be incrementally updated so that the model is aware of the appended values. The forecast model and the current context are observed in real time 104 and can be evaluated using one or more model evaluation techniques 106, including accuracy-based and interval-based techniques. Furthermore, one or more previously used parameter combinations can be stored 108 within the CFMR. In some implementations, when the forecast model is to be adapted to a new context, parameter combinations that were valid for a similar, previously occurring context can be retrieved 110 from the CFMR. These parameter combinations can serve as initial starting points for a parameter optimization process 112, which revises the current model parameter combination to converge to a new optimal solution 114. The result is a new parameter combination that can be used to predict future development of the time series. This new parameter combination can be stored in the CFMR and can be associated with a context.

One or more of types of context drift can occur over time, including abrupt drift, persistent drift, and cyclic drift. Abrupt drift occurs when a context is abruptly replaced by a new context and causes a disruptive change in the time series within a short period of time. For example, in the energy domain, a local sporting event or a power outage can cause an abrupt drift in the context. In this case, the old context can be re-instantiated after a short period of time, and the accuracy requirements of the forecast model can determine whether this abrupt drift should be addressed by model updates.

Persistent drift occurs when a context gradually transforms into a new context. In this case, the previous context is not restored after a short period of time, and the new context is permanently established. Examples of persistent drift include relatively slow changes, such as family growth, campaigns to decrease energy usage, and aging of wind turbines. In some examples, a persistent change in context should be addressed in the forecast model.

Cyclic drift occurs when two or more contexts constantly alternate among one another. This can often occur as a result of seasonal or regular weather patterns. In some examples, if the one or more contexts alternate regularly and can be quantified, then cyclic changes can be addressed in the forecast model.

In some implementations, context drifts can be addressed by model evaluation capabilities. In order to address the increasing forecast errors that occur as a forecast model and its time series deviate in assumed contexts, a continuous threshold-based model evaluation technique can be used to continuously evaluate the forecast error as the time series evolves. The maximal accepted forecast error can be limited by a defined threshold, and when the forecast error exceeds the threshold, the forecast model can be adapted to a new context. In some implementations, an ensemble strategy that combines two or more model evaluation techniques can be applied to the forecast model. The combination of model evaluation techniques can reduce the dependence of the model accuracy on a single criterion, which facilitates determination of suitable parameter combinations.

In some implementations, when a forecast model is invalidated, the CFMR can be searched for parameter combinations that had previously provided accurate forecasts for similar contexts. The identified one or more parameter combinations can be used as starting points for subsequent local optimizations. The most current values of the time series can be compared to values of past time series subsequences corresponding to the identified one or more parameter combinations to further identify the most suitable combination of parameters. In some examples, a high degree of coincidence between a current subsequence and a past subsequence can indicate a similarity in the context of the current forecast model and the context of the past model. In some examples, the parameter combination can be used as a quick intermediate result to further increase the forecast model accuracy while a final result is still being sought.

Figure 2:
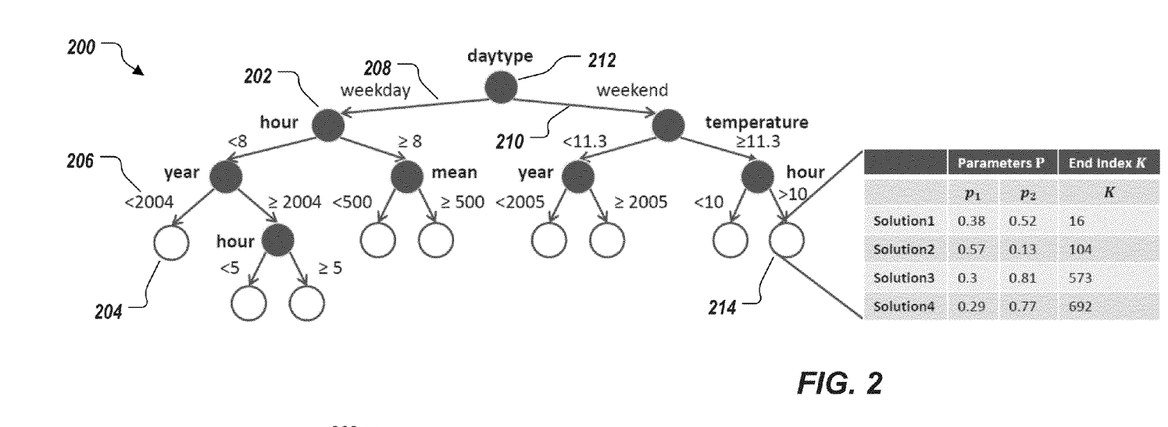
FIG. 2 is a diagram depicting an example Model History Tree.

Referring now to FIG. 2, the CFMR can be organized into a binary search tree 200 that is herein referred to as a Model History Tree (MHT). The MHT can include parameter vectors $p=[p_i|i=1, \ldots, P]$ having attributes $[a_i]$ corresponding to a current context, one or more decision nodes (denoted by solid circles, 202) and one or more leaf nodes (denoted by hallow circles, 204). In some examples, a decision node can contain a splitting attribute $\grave{a}_i \epsilon \{a_1, \ldots, a_n\}$, a splitting values $\acute{s} \epsilon \grave{a}_i$ 206, and references 208, 210 to a left successor node and a right successor node, respectively, where $\{a_1, \ldots, a_n\}$ are similarity attributes (herein also referred to as context attributes), and splitting attributes are context-related influence variables of the time series that can divide a previous set of parameter combinations into two groups. In some examples, a decision node can be a root node 212, which is the highest level decision node (i.e., the origination node) of the MHT.

In some examples, a leaf node can contain a list of similarity attributes that have been previously used in the tree branch containing the leaf node, $c \leq c_{max}$ parameter vectors, and an index K for each parameter vector, where $c_{max}$ is the maximum leaf node capacity (i.e., the maximum number of parameter vectors that can be stored in the leaf node), and K is an index that represents the last time that the parameter vector was used.

In the example MHT displayed in FIG. 2, the similarity attributes include daytype, temperature, hour, year, and mean. The highlighted leaf node 214 includes four parameter vectors that each have two parameter attributes $p_1$ and $p_2$. The MHT forms a recursive partitioning of the entire parameter space into a set of disjoint subspaces, while the splitting attributes can be considered as (n−1)-dimensional axially parallel hyperplanes. At each decision node 202, the MHT branches the parameter space into parameter combinations having attribute values that are smaller than the splitting attribute and attribute values that are larger than or equal to the splitting attribute.

Similarity attributes $a_i$ can generally be one or more of numerical attributes, nominal attributes, and cyclic attributes and take on values within the domain $[a_i^{min}, a_i^{max}]$. Numerical attributes have values that are real numbers, and nominal attributes have values that are qualitative and/or categorical. Cyclic attributes have instance values that repeat every k indexes (i.e., $a_i = a_{i+k}$) and are often connected with seasonal cycles. In some examples, cyclic attributes can be numerical attributes. In some examples, cyclic attributes can be nominal attributes.

Similarity attributes guide the search through the CFMR for suitable parameter vectors, which can restrict the initial parameter space early on in the search process and can exclude a majority of previously used parameter vectors from being further processed. To further restrict the number of possible parameter vectors, the values of the current subsequence can be compared to the corresponding values of the time series subsequence of a parameter vector. Performing this comparison using the index K ensures that the respective subsequences are in phase. In some implementations, a subsequence similarity search can compare the similarity of the current subsequence and a past subsequence by computing the Pearson cross-correlation coefficient, which reflects a distance between two subsequences:

$$R_{zz'}(\tau) = \frac{\sum_{i=1}^{N-\tau}(z_i - \bar{z})(z'_{i+\tau} - \bar{z'})}{\sqrt{\sigma_z^2 \sigma_{z'}^2}} \quad (1)$$

where z are the values within the first subsequence, z' are the values within the second subsequence, $\bar{z}$ is the mean of the first subsequence, $\bar{z'}$ is the mean of the second subsequence, $\sigma_z^2$ is the variance of the first subsequence, $\sigma_{z'}^2$ is the variance of the second subsequence, and $\tau$ is a time lag.

A higher Pearson cross-correlation coefficient indicates a higher similarity between two subsequences, and the parameter vector having the highest similarity to the current subsequence can be selected as the set of starting values for a local optimization of the forecast model parameters. Equation 1 is valid when both subsequences have equal lengths. To ensure that the lengths are equal, a fixed subsequence length is selected from a respective point in both subsequences. In some examples, the subsequences can originate from different start indexes (i.e., the subsequences are out of phase), which will generate a low cross-correlation, even if the values within the subsequences otherwise provide similar subsequence shapes. In order to address this issue, one subsequence can be shifted past the other subsequence according to the time lag $\tau$, which is denoted with respect to the ending index K (of the previous subsequence), the index N (of the current subsequence), and the known period $s_e$ of a seasonal cycle:

$$\tau = |K \bmod s_e - N \bmod s_e| \quad (2)$$

Thus, $\tau$ aligns the subsequences by eliminating the outer values of both subsequences, and the cross-correlation coefficient can yield a similarity measure for time series that have variable amplitudes, offsets, and levels.

In some implementations, other processes can be used to evaluate the similarity between two subsequences, such as Dynamic Time Warping or Longest Common Subsequence techniques.

Figure 3:
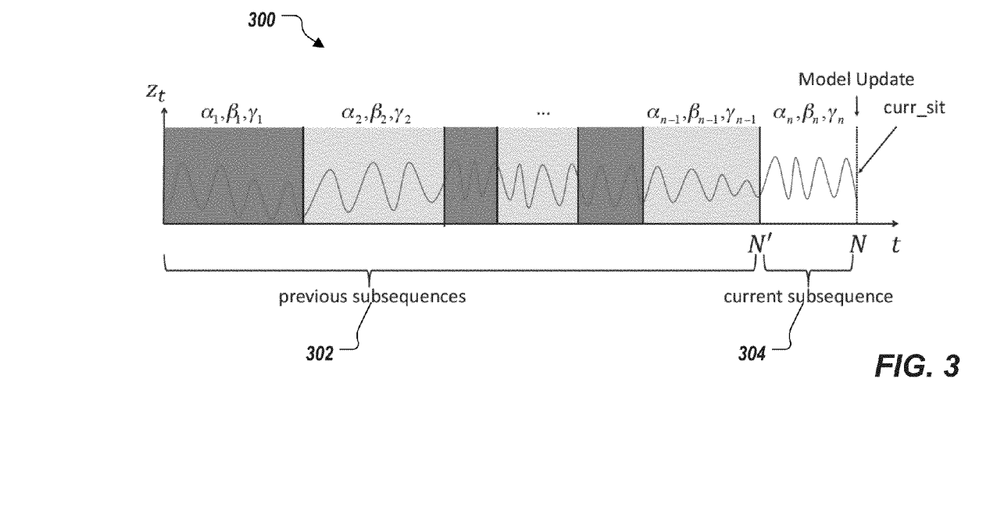
FIG. 3 is a diagram depicting example time series subsequences.

FIG. 3 is an example time series 300 including previous subsequences 302 and a current subsequence 304 within a time series, where various parameter combinations ($\alpha,\beta,\gamma$) were used to forecast the corresponding subsequences of the time series. In the example time series of FIG. 3, the subsequence values are denoted by $z_t$, and the current subsequence lasts from N' to N.

For purposes of illustration, and by non-limiting example, a current context can lead to the node 214, which includes solutions Solution1, ..., Solution4 having respective parameter sets {p1,p2} with associated indexes K. For example, and using the example values of FIG. 2, the current context can include a weekend at a temperature of greater than or equal to 11.3° C. and an hour later than 1000 (in 24-hour format; 10:00 AM). Consequently, the search results in four possible parameter set solutions (i.e., Solution1, ..., Solution4). For each parameter set an associated previous time series subsequence is retrieved based on the associated index K. A cross-correlation coefficient is determined for each parameter set based on the respective previous time series subsequences and the current time series subsequence. Continuing with the example of FIG. 2, a cross-correlation coefficient would be provided for each solution Solution1, ..., Solution4. The solution having the highest cross-correlation coefficient is selected and the parameters provided in the selected solution are used for optimization. In some implementations, and as discussed in further detail herein, further searching can be conducted to identify better parameters, while optimization begins using the initially selected parameters.

Figure 4:
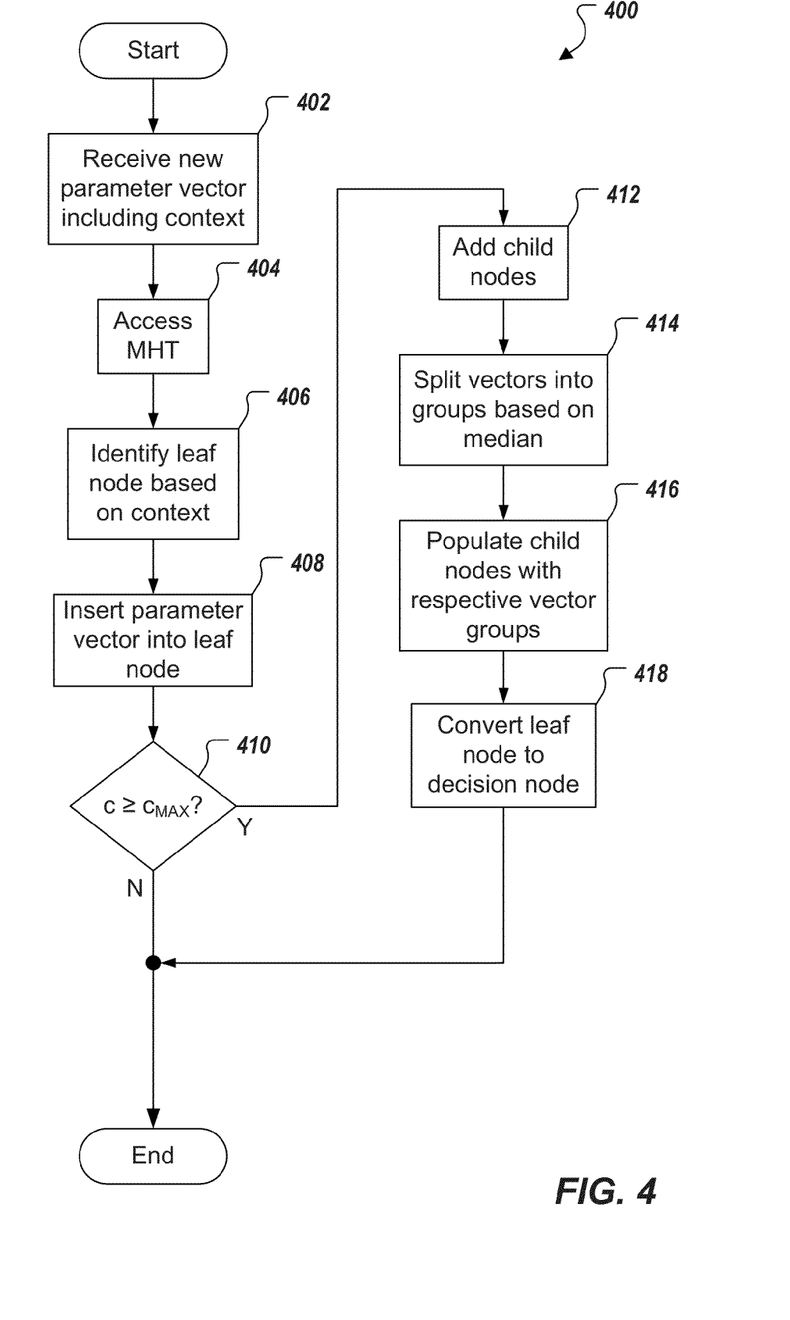
FIG. 4 is a flowchart illustrating an example process that can be executed in accordance with implementations of the present disclosure.

Referring now to FIG. 4, a flowchart illustrates an example process 400 that can be executed in accordance with implementations of the present disclosure. In some implementations, when a parameter vector p is to be inserted within an MHT, an algorithm can receive the parameter vector and its associated context 402, access the MHT 404, and traverse the MHT to identify the leaf node having a context most similar to the received context 406. When the leave node is identified, the algorithm can insert the parameter vector p into the leaf node 408. In some implementations, if the number of parameter vectors stored in the leaf node then exceeds the maximum leaf node capacity $c_{max}$ 410, the algorithm can add two child nodes to the leaf node 412, split the parameter vectors into two groups using a splitting attribute $\dot{a}_i$ and a split value $\dot{s}_i \in \dot{a}_i$ that are determined from the models stored in the leaf node and based on a median value 414, and populate the two child nodes with the respective groups 416. The process 400 can convert the leaf node into a decision node 418 with references to the new child nodes.

In some implementations, the split value $\dot{s}_i$ can be the mean of all split values $\dot{a}_i$, which can be valid for numerical attributes.

In some implementations, the split value $\dot{s}_i$ can be the median of all split values $\dot{a}_i$, which can be valid for numerical, nominal, and cyclic attributes. The median value is a central value that partitions the possible values $[\dot{a}_i]$ for the attribute a with i=N', ..., N into even halves. The median can be determined once the attribute values are sorted in ascending order, which generates a list $[a_j]$, where $\in\{N', \ldots, N\} \wedge a_j \leq a_{j+1}$. Given the minimum and maximum attribute values ($a_{min}$ and $a_{max}$, respectively) within the ordered list $[a_j]$, the median $\tilde{a}$ can be defined as follows:

$$\tilde{a} = \begin{cases} a_{min+\frac{max-min}{2}}, & \text{if } N' - N \text{ even} \\ \frac{1}{2}\left(a_{min+\frac{max-min-1}{2}} + a_{min+\frac{max-min-1}{2}+1}\right), & \text{else.} \end{cases} \quad (3)$$

Determining the median value using Equation 3 results in the same number of models being inserted into each successor, regardless of which attribute is used as a splitting attribute.

The median does not, however, distinguish homogeneously spread attributes from heterogeneously spread attributes, whose higher density values can lead to better split values. Thus, in some implementations, the (Percental) Interquartile Range ((P)IQR) can be additionally used as a measure of dispersion within the attribute values and provide a measure of the suitability of the attribute as a splitting attribute. Given a list of attributes $[a_i|i=1, \ldots, N]$, the interquartile range (IQR) can be defined as the average of the first and third quartiles:

$$IQR = \frac{\tilde{a}_i^3 - \tilde{a}_i^1}{2} \quad (4)$$

with $\tilde{a}_i^1 = \tilde{l}$ and $l=\{a_j \leq \tilde{a}_i\}$ 1st Quartile (Median of left half)
with $\tilde{a}_i^3 = \tilde{r}$ and $r=\{a_j \geq \tilde{a}_i\}$ 3rd Quartile (Median of right half)

In order to ensure that attributes having a homogeneous distribution, but a large total range and thus a large IQR are not preferred over those with a heterogeneous distribution and a small total range, the IQR is normalized by the total range of attribute values:

$$PIQR = \frac{IQR}{2(a_N - a_1)} \quad (5)$$

Thus, the attribute with the highest PIQR-value (i.e., the one with the lowest dispersion) is selected as the splitting attribute.

In some implementations, the MHT can still degenerate to become imbalanced (i.e., more new parameter vectors are added to one branch of a decision node than to the other). In some examples, the imbalance can occur because populating the MHT using median heuristics is based only on local decisions, which means that the leaf nodes considered for splitting represent only a small sub-region of the entire MHT. In order to ensure that the MHT is globally balanced, a global balancing strategy that is based on the heights of the sub-trees can be applied to the MHT. The height h(n) of a node n can be defined as:

$$h(n) = \begin{cases} 0, & \text{if } n \text{ is a leaf node} \\ 1 + \max(h(n \cdot \text{left}, n \cdot \text{right})), & \text{if } n \text{ is a decision node} \end{cases} \quad (6)$$

In some examples, a node n is B(max)-balanced if its balance factor $B(n)=|h(n.\text{left})-h(n.\text{right})| \leq B_{max}$.

B(max)-balanced nodes possess the property that the heights of their left and right sub-trees differ at most by a predefined maximal balance factor $B_{max}$. In some implementations, global balance of the MHT can be achieved by regularly checking the balancing condition. In some examples, if the MHT is determined to be imbalanced, then the MHT can be regenerated, which means that the MHT can be completely rebuilt. When the MHT is regenerated, the splitting decision made at an upper intermediate node can be based on all models below that node. Basing the splitting on the median can ensure that the regenerated MHT is balanced.

Figure 5:
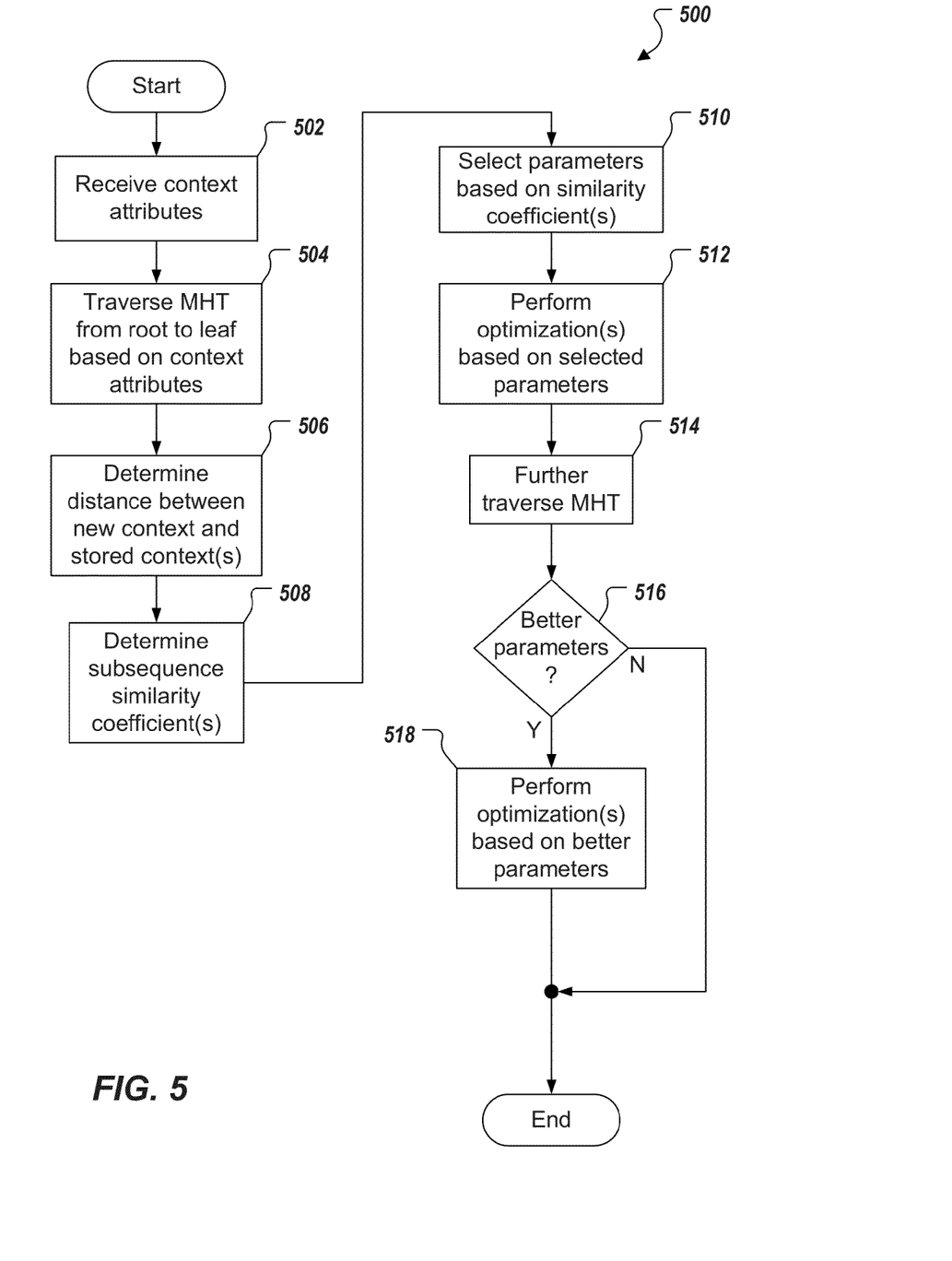
FIG. 5 is a flowchart illustrating an example process that can be executed in accordance with implementations of the present disclosure.

Now referring to FIG. 5, a flowchart illustrates an example process 500 that can be executed in accordance with implementations of the present disclosure. In some implementations, when a current forecast model needs adjusting to reflect a new context, an algorithm can receive a context vector specifying the new context attributes 502 at a current time, the maximum number of retrieved parameter combinations, and one or more auxiliary variables. The algorithm can then search the MHT for a parameter vector whose context attributes are similar to the new context attributes by using a k-nearest neighbor (k-nn) search, where the k most similar contexts can be obtained. Starting from the root node, the algorithm can traverse the MHT by traveling in a direction from each decision node according to the new context attributes and the splitting attribute of each decision node until the algorithm reaches a leaf node whose context attributes closely match the new context attributes 504.

Once the algorithm reaches this leaf node, the algorithm can determine a distance between the new context attributes $C_{new}$ and each of one or more sets of context attributes $C_{old}$ stored in the leaf node 506. The algorithm can then determine one or more similarity coefficients by comparing the current time series subsequence to each of the subsequences associated with the one or more parameter vectors stored in the leaf node 508. Based on the similarity coefficients, the algorithm can select a parameter vector to approximate the current time series 510 and then perform optimizations 512 to refine the parameter vector for accurately forecasting the future evolution of the current time series. While the optimizations are being performed, the algorithm can further search the MHT 514 for parameter vectors whose context attributes are more similar to the new context attributes than are the context attributes of the currently selected parameter vector. In some implementations, if the algorithm identifies such a new parameter vector 516, then the algorithm can perform optimizations based on the new parameter vector 518.

In some examples, the distance computed between the new context attributes $C_{new}$ and each of one or more sets of context attributes $C_{old}$ stored in the leaf node can be a Euclidean distance $D_{Eu}$, which provides a small distance value for models that agree in important attributes:

$$D_{Eu} = \sqrt{\sum_{i=1}^{n} (v_i - w_i)^2} \quad (6)$$

where v is an attribute of the new context, w is an attribute of a stored (old) context, and n is the total number of available context attributes. In some implementations, up to k results of $D_{Eu}$ can then be stored in one or more auxiliary algorithm variables. In some examples, an auxiliary variable best can be generated and can store up to the best k points (i.e., the shortest k distances, $D_{Eu}$), along with the context attributes [$a_i$] and model parameters [$p_i$]). In some examples, a similarity coefficient comparing the current time series subsequence to a subsequence predicted by a parameter vector stored in the leaf node can be the Pearson cross-correlation coefficient (Equation 1).

In some implementations, while the optimizations are being performed, the algorithm can further search the MHT by traversing from the leaf node back up to a decision node and performing a ball-overlap-bounds (bob) test at the decision node to evaluate the existence of additional solutions that may be present in an opposite branch of the decision node. In some examples, the opposite branch can be checked for distances shorter than the longest distance $D_{Eu(Max)}$ that is stored in the variable best. The check can be performed by intersecting an n-dimensional ball having a radius equal to $D_{Eu(Max)}$ with the splitting hyperplane. Thus, the bob test can determine whether or not the ball around the worst intermediate result overlaps the hyperplane. If this case is true, then the algorithm can traverse the MHT along the other branch of the decision node and repeat the example process 500 on further nodes higher in the hierarchy until this case is false (i.e., until the parameter vector having context attributes most similar to the new context attributes has been identified). If this case is false, then the algorithm ultimately ascends up to the root node, performing the bob test on further intermediate decision nodes higher in the hierarchy and terminates upon reaching the root node.

In some implementations, the k-nn search can evaluate all nodes in the MHT. Long runtimes can be avoided by further processing the intermediate results in parallel (i.e., computing subsequence similarity coefficients and optimizations) and using them as temporary parameter combinations for forecasting the time series evolution. In some examples, this processing is feasible because even the first set of intermediate results can be at least a good approximation to the current time series subsequence. Additional results can then be accepted if they improve upon the currently known worst intermediate result.

In some implementations, the optimizations can be local optimizations (e.g., Nelder-Mead optimizations). In some implementations, the optimizations can be global optimizations (e.g., Simulated Annealing optimizations). In some examples, global optimizations can run in parallel to local optimizations. Re-estimating new model parameters using optimization techniques can involve thousands of simulations, and the time period of this process can be much longer than the updating interval between subsequent MHT insertions. In some examples, the time period can grow as one or more of the number of training values, the number of model parameters, or the complexity of the forecast model grows. Given the long time periods often needed for model parameter re-estimation, the process can be improved by taking advantage of previously retrieved starting points.

The starting points for the local optimizations are the parameter attributes provided by the CFMR. In some examples, due to continuous adaptation of the forecast model to a drifting context, the parameter attributes change only gradually with respect to the new context and the old context. Thus, there is a high probability that the optimal global parameter attributes will be found close to the starting points. It is still advisable, however, to check regions of the parameter space that are not covered by the local optimization process. Since the global search is independent of the starting values provided by the CFMR, the global search can run in parallel (asynchronously in the background) to the local search. Thus, the global search can continue to run even after the local search determines an optimal solution and all regions of the parameter space are checked for solutions. If the global solution identifies a solution better than that identified by the local search, then this solution can be used as a starting point for the global optimization.

Figure 6A:
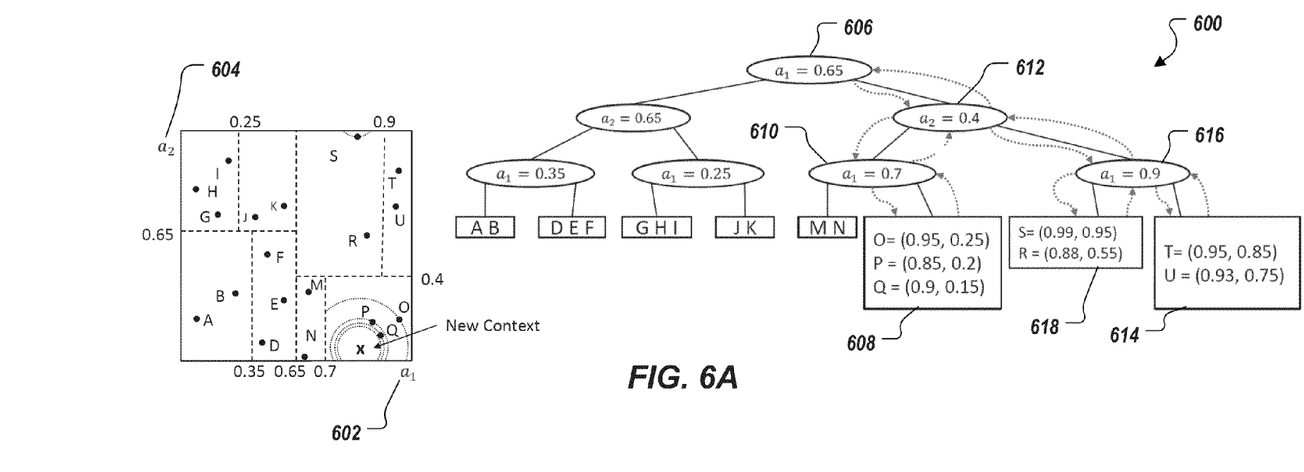
FIG. 6A is a diagram depicting an example parameter retrieval.

FIG. 6A depicts an example MHT 600 for which the example process 500 can be implemented. Attributes $a_1$ 602 are non-cyclic, attributes $a_2$ 604 are cyclic, and the maximum number of retrieved models in best is set to k=2. The algorithm traverses the MHT 600 from the root node 606 to a first leaf node 608 having context attributes similar to new context attributes received by the algorithm. At the first leaf node 608, the algorithm identifies O, P, and Q as initial parameter sets, computes the respective Euclidean distances between the new context attributes (new context X) and the context attributes of O, P, and Q, and stores the best k distances in the variable best (e.g., k=2). In the depicted example, P and Q have the shortest distances to the new context. Consequently, P, and Q are stored in the variable best. The algorithm initiates similarity calculations between the current time series subsequence and the respective subsequences associated with P and Q. Consequently, a cross-correlation coefficient for each of P and Q is determined based on their respective time series subsequences and the current subsequence. In the depicted example, it can be determined that Q includes the greater of the two cross-correlation coefficients. Consequently, the parameters provided in Q can be selected and model optimization can be initiated based on the selected parameters.

Although model optimization is initiated based on the parameters provided in P, the MHT can be further searched for potentially better parameters. To this end, the algorithm traverses the MHT from the leaf node 608 back up to the decision node 610 and performs a bob test. In the depicted example, the result of the bob test is negative indicating that no other branches of the decision node 610 has potentially better parameters.

The algorithm continues to traverse the MHT up to the decision node 612. The algorithm performs a bob test at the decision node 612. In the depicted example, the bob test at the decision node 612 generates a positive result indicating that there is potential for better parameters in another branch of the decision node 612. Consequently, the algorithm recursively traverses from decision node 612 down to all leaf nodes below, including 612 and 614, where it first identifies U and T as potentially better parameter sets in node 614. The algorithm can compute the Euclidean distance between the new context attributes and the context attributes of U and T. In the depicted example, neither U nor T have a shorter distance to the new context attribute than does P and/or Q. Consequently, the variable best is not updated, and the parameters provided in Q are still deemed to be the best parameters with model optimization continuing accordingly.

The algorithm traverses the MHT from the leaf node 614 back up to the decision node 616, and traverses from decision node 616 down to leaf node 618, where it identifies R and S as potentially better parameter sets. The algorithm can compute the Euclidean distance between the new context attributes and the context attributes of R and S and stores these distances. In the depicted example, S has a shorter distance to the new context attribute than does P or R. Consequently, the variable best is updated to include S. The algorithm initiates similarity calculations between the current time series subsequence and the respective subsequences associated with the elements of best (i.e., S and Q). Consequently, a cross-correlation coefficient for each of S and Q is determined based on their respective time series subsequences and the current subsequence. In the depicted example, it can be determined that S includes the greater of the cross-correlation coefficients. Consequently, the parameters provided in S are deemed to be the best parameters. The running model optimization can be augmented to account for the parameters provided in S. In some examples, the originally provided parameters (i.e., from Q) can be replaced with the parameters from S.

The model traverses the MHT from the leaf node 618 back up through the decision nodes 616 and 612 (which have already been tested) to the root node 606. A bob test is performed at the root node 606 and returns a negative result. Thus, the algorithm terminates and the model optimization continues based on the parameters provided in S.

Figure 6B:
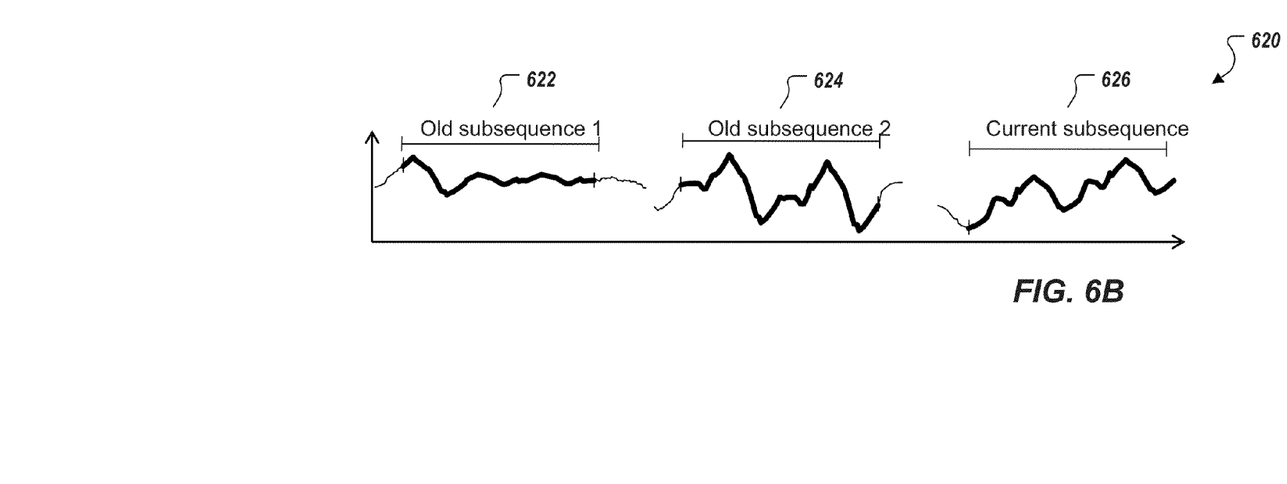
FIG. 6B is a diagram depicting example time series subsequences.

FIG. 6B displays an example set 620 of subsequences. An old subsequence 1 622 and an old subsequence 2 624 can, for example, correspond to the subsequences provided by models S and R of FIG. 6A, respectively. A current subsequence 626 can be provided to an MHT such as the MHT 600 for parameter attribute retrieval.

Figure 7:
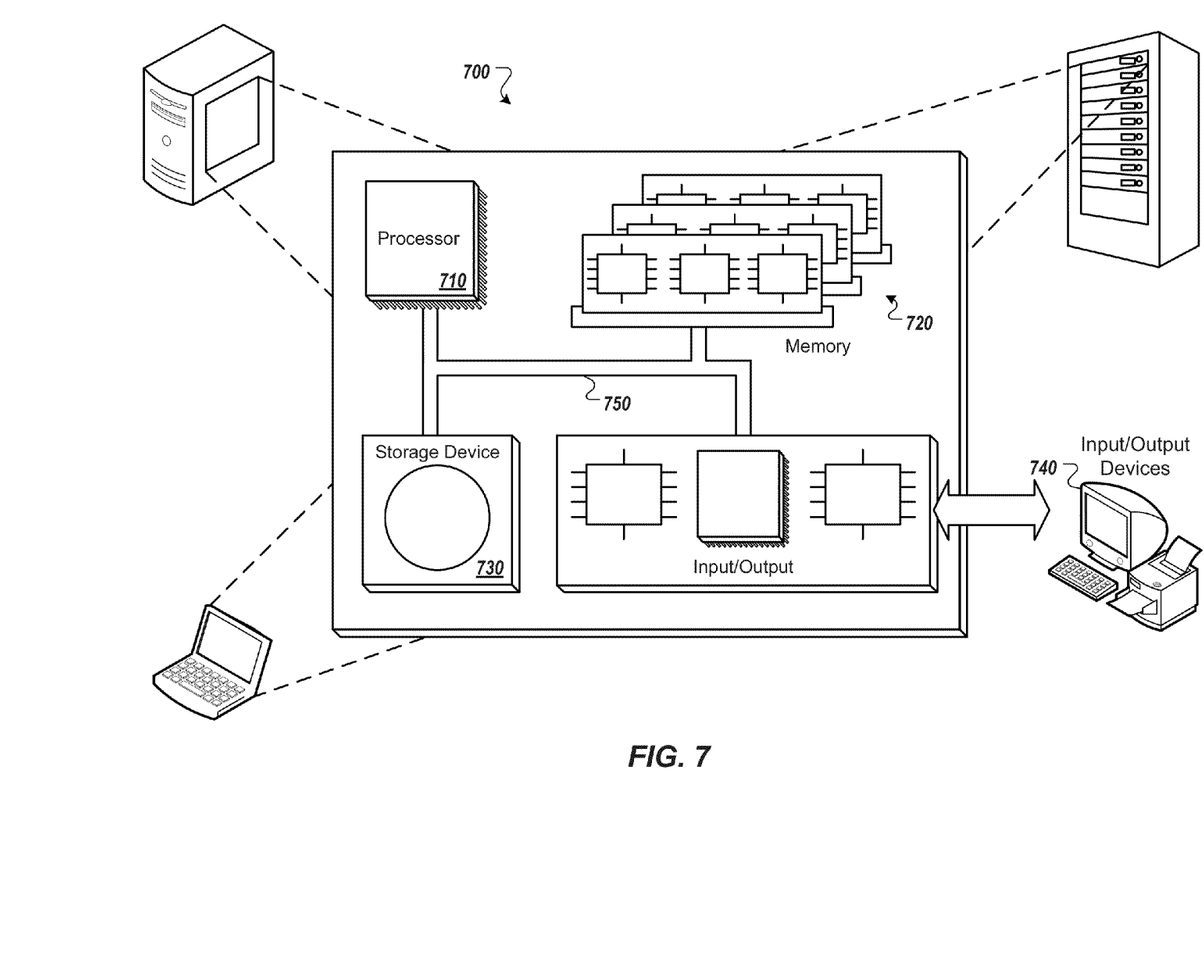
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

A number of implementations of the present disclosure have been described. Nevertheless, it will be understood that various modifications may be made without departing from the spirit and scope of the present disclosure.

What is claimed is:

1. A computer-implemented method for providing at least one parameter for use with a forecast model, the method being executed using one or more processors and comprising:
receiving, by the one or more processors, a first context vector, the first context vector comprising a plurality of context attributes at a current time, that describe a first context of an energy time series;
retrieving, by the one or more processors, a first parameter vector from a repository based on the first context vector, the repository electronically storing a plurality of parameter vectors that describe respective contexts, each of the respective contexts comprising a plurality of external factors defining one or more of a seasonal pattern, an event and an exception and each of the plurality of parameter vectors comprising one or more parameters;
parameterizing, by the one or more processors, the forecast model based on the one or more parameters provided in the first parameter vector to provide a parameterized forecast model;
optimizing, by the one or more processors, the parameterized forecast model using a local optimization that runs in parallel to a global optimization to provide an optimized forecast model based on the first context;
forecasting, by the one or more processors, one or more values using the optimized forecast model; and
adjusting, by the one or more processors, an energy supply based on the one or more values.

2. The method of claim 1, wherein retrieving a first parameter vector from a repository comprises:
identifying a sub-plurality of parameter vectors based on the first context vector, the sub-plurality of parameter vectors including the first parameter vector;
for each parameter vector in the sub-plurality of parameter vectors, determining a cross-correlation coefficient; and
determining that a cross-correlation coefficient associated with the first parameter vector is the highest cross-correlation coefficient of the parameter vectors in the sub-plurality of parameter vectors and, in response, retrieving the first parameter vector.

3. The method of claim 2, wherein each cross-correlation coefficient reflects a distance between context attributes of the respective context and context attributes of the first context vector.

4. The method of claim 2, wherein each cross-correlation factor is provided as a Pearson cross-correlation coefficient.

5. The method of claim 1, wherein the repository is organized into a binary search tree.

6. The method of claim 5, wherein the binary search tree comprises a plurality of decision nodes and a plurality of leaf nodes, each decision node associated with a context attribute, each leaf node associated with one or more parameter vectors provided in a sub-plurality of parameter vectors.

7. The method of claim 6, wherein at least one decision node contains a splitting context attribute, a splitting value, and references to a left successor node and a right successor node.

8. The method of claim 5, wherein retrieving a first parameter vector comprises traversing nodes of the binary search tree based on context attributes of the first context vector.

9. The method of claim 8, further comprising:
re-traversing nodes of the binary search tree based on context attributes to retrieve a second parameter vector; and
parameterizing the forecast model based on parameters provided in the second parameter set to provide the parameterized forecast model.

10. The method of claim 9, wherein re-traversing nodes of the binary search tree comprises performing a ball-overlap-bounds test at a decision node to evaluate an existence of additional parameter vectors that may be present in an opposite branch of the decision node.

11. The method of claim 1, further comprising:
receiving a second context vector, the second context vector comprising a plurality of context attributes that describe a second context;
retrieving a second parameter vector from the repository based on the second context vector;
parameterizing the forecast model based on parameters provided in the second parameter vector to provide the parameterized forecast model;
optimizing the parameterized forecast model to provide the optimized forecast model; and forecasting one or more values using the optimized forecast model.

12. The method of claim 11, wherein receiving a second context vector occurs in response to a context drift from the first context to the second context.

13. The method of claim 12, wherein the context drift comprises one of an abrupt drift, a persistent drift and a cyclic drift.

14. The method of claim 1, further comprising:
receiving the first parameter vector and a respective context vector; and
storing the first parameter vector in the repository based on context attributes of the respective context vector.

15. The method of claim 14, wherein storing the first parameter vector comprises:
traversing a binary search tree structure of the repository to identify a leaf node having a context that is most similar to the respective context vector; and
inserting the first parameter vector into the leaf node.

16. The method of claim 14, wherein storing the first parameter vector comprises:
traversing a binary search tree structure of the repository to identify a leaf node having a context that is most similar to the respective context vector; and
determining that a number of parameter vectors exceeds a maximum leaf node capacity and, in response:
adding at least two child nodes to the leaf node,
splitting parameter vectors of the leaf node into at least two groups,
populating that at least two child nodes with the at least two groups, respectively, and
converting the leaf node into a decision node with references to the at least two child nodes.

17. The method of claim 16, wherein splitting the parameter vectors into at least two groups is performed based on a splitting attribute and a split value that are determined from the models stored in the leaf node and based on a median value.

18. The method of claim 1, wherein context attributes comprise one or more of numerical attributes, nominal attributes and cyclic attributes.

19. A non-transitory computer-readable storage medium coupled to one or more processors and having instructions stored thereon which, when executed by the one or more processors, cause the one or more processors to perform operations for providing at least one parameter for use with a forecast model, the operations comprising:
receiving a first context vector, the first context vector comprising a plurality of context attributes, at a current time, that describe a first context of an energy time series;
retrieving a first parameter vector from a repository based on the first context vector, the repository electronically storing a plurality of parameter vectors that describe respective contexts, each of the respective contexts comprising a plurality of external factors defining one or more of a seasonal pattern, an event and an exception and each of the plurality of parameter vectors comprising one or more parameters;
parameterizing the forecast model based on the one or more parameters provided in the first parameter vector to provide a parameterized forecast model;
optimizing the parameterized forecast model using a local optimization that runs in parallel to a global optimization to provide an optimized forecast model based on the first context;
forecasting one or more values using the optimized forecast model; and
adjusting an energy supply based on the one or more values.

20. A system, comprising:
a computing device; and
a computer-readable storage device coupled to the computing device and having instructions stored thereon which, when executed by the computing device, cause the computing device to perform operations for providing at least one parameter for use with a forecast model, the operations comprising:
receiving a first context vector, the first context vector comprising a plurality of context attributes, at a current time, that describe a first context of an energy time series;
retrieving a first parameter vector from a repository based on the first context vector, the repository electronically storing a plurality of parameter vectors that describe respective contexts, each of the respective contexts comprising a plurality of external factors defining one or more of a seasonal pattern, an event and an exception and each of the plurality of parameter vectors comprising one or more parameters;
parameterizing the forecast model based on the one or more parameters provided in the first parameter vector to provide a parameterized forecast model;
optimizing the parameterized forecast model using a local optimization that runs in parallel to a global optimization to provide an optimized forecast model based on the first context;
forecasting one or more values using the optimized forecast model; and
adjusting a an energy supply based on the one or more values.

* * * * *